United States Patent Office 3,197,326
Patented July 27, 1965

3,197,326
PRESSURE SENSITIVE ADHESIVE TAPE
Charles S. Webber, Loudonville, N.Y., assignor to Norton Company, Troy, N.Y., a corporation of Massachusetts
Filed Oct. 26, 1964, Ser. No. 407,622
2 Claims. (Cl. 117—76)

The present invention relates to the formation of pressure sensitive adhesive tapes and more particularly to such tapes having as a backing a polyester film such as polyethylene-terephthalate, and forms a continuation-in-part of my earlier application, Serial No. 190,209, filed April 24, 1962 and now abandoned.

Pressure sensitive adhesive tapes have heretofore been made on film backings of polyester materials such as "Mylar" (DuPont's polyethylene-terephthalate). Films of this type are extremely non-receptive to the type of materials normally used as pressure sensitive adhesives, i.e. natural or synthetic rubbers in combination with various tackifier resins. Several examples of efforts to improve the adhesion properties of such films are to be found in U.S. Letters Patent Nos. 2,765,241 and 2,878,142.

It has now been found that improved adhesion of rubber-resin type adhesives to polyethylene-terephthalate films can be achieved through the use of a novel primer which may be applied in a one or a two-step process.

Accordingly, an object of the present invention is to provide a means for improving the adhesion of rubber-resin-type adhesives to polyethylene-terephthalate film surfaces.

Another object is to provide an improved pressure sensitive adhesive tape utilizing as a backing member therefor a polyethylene-terephthalate film.

Additional objects if not specifically set forth herein will be readily apparent from the following detailed description of the invention:

Figure 1:
FIGURE 1 is a view in cross-section of one form of tape produced by the present invention.
Figure 2:
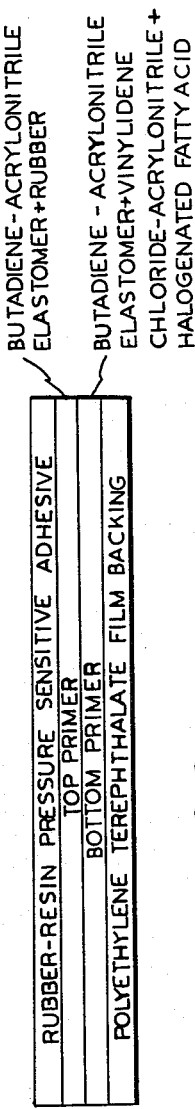
FIGURE 2 is a cross-sectional view of a tape illustrating a modification of the present invention.

Generally, the present invention comprises a tape utilizing any of a number of heretofore known rubber-resin pressure sensitive adhesives and a backing member of polyethylene-terephthalate film wherein said adhesive is anchored to said film by at least one interposed coat of primer adhesive—at least the coat of such primer adhesive in contact with said film containing a mixture of a butadiene-acrylonitrile elastomer, a vinylidene chloride-acrylonitrile copolymer and a halogenated fatty acid.

More specifically, it has now been found that a primer adhesive containing as the essential components the materials listed above may be used to firmly anchor rubber-resin pressure sensitive adhesives to a polyethylene-terephthalate film backing. The primer may be applied in either of two ways. A double primer may be used with the first primer (i.e. the one applied to the film backing) consisting of the butadiene-acrylonitrile elastomer, a halogenated fatty acid and the vinylidene chloride-acrylonitrile copolymer, followed by a top coat of the second primer consisting of a butadiene-acrylonitrile elastomer plus a compound selected from the group consisting of natural and synthetic rubbers wherein the compound is compatible with the elastomer used in the adhesive to be bonded to the top or second primer, e.g. if a natural rubber adhesive is to be used, the second component of the top primer coat might be pale crepe rubber, or should a GR-S type adhesive be intended for use, then the second component of the top primer would be a butadiene-styrene rubber. Neoprene could be used as the second component to bond with either natural rubber or SB-R type adhesives. Alternatively, the primer can be applied as a single coat by adding to the three essential components listed above a chloroprene compound and a tackifying resin such as a phenolated terpene resin.

Examples of the primer compositions described above are:

(A) TWO-PART PRIMER

*Base coat*

Parts by weight

10% butadiene-acrylonitrile (Hycar 1022) in methylethyl ketone _____ 300
20% vinylidene chloride-acrylonitrile (Saran F220) methylethyl ketone _____ 300
Trichloroacetic acid _____ 15

*Top coat*

10% butadiene-acrylonitrile (Hycar 1022) in methylethyl ketone _____ 150
5% pale crepe in toluene _____ 300

The ratio of butadiene-acrylonitrile to vinylidene chloride-acrylonitrile may vary from 1:1 to 1:4, but the preferred ratio is 1:2 as shown above. The halogenated fatty acid (which may be trichloroacetic acid as illustrated or dichloroacetic acid or monochlorodifluoroacetic acid or dichloromonofluoroacetic acid) may range from a concentration of 5 parts/600 parts of the other components up to 50 parts/600 parts, but the preferred concentration is 15 parts/600 parts as shown:

The components in the second part or top coat may vary as discussed above and the ratio can vary from the 1:1 illustrated to 1:2 to 2:1.

Solvent concentration may be varied to meet the viscosity requirements of the desired method of application, i.e. air knife, reverse roll coating, etc.

(B) SINGLE PRIMER

Parts by weight

10% butadiene-acrylonitrile (in MEK) _____ 300
20% vinylidine chloride-acrylonitrile (in MEK) __ 150
10% chloroprene (Neoprene WRT) (in MEK) ___ 155
50% phenolated terpene (Newport "S") in toluene _____ 100
50% trichloroacetic acid (in toluene) _____ 40

Again, as above, the trichloroacetic acid can be replaced by one of the other halogenated fatty acids listed and may vary from 10 to 200 parts. The primer components may be varied within fairly wide limits, e.g. 6:6:3:10:1 to 6:6:6:10:10 to 6:6:12:0:12 or more so long as each component is sufficient to aggressively attach itself to the polyethylene-terephthalate film base and to the rubber-resin mass. Practically as little of the corrosive halogenated acid is used as possible—the preferred ratio of components being as shown—6:6:3:10:4.

Typical rubber-resin pressure sensitive adhesive masses useful with this primer are well known to the art and representative formulations are illustrated by the following:

(A)

Parts by weight

Natural rubber _____ 100
Polyterpene resin (Piccolyte 125) _____ 75
Rosin derivative (Tenex) _____ 10
Antioxidant _____ 2
Lanolin _____ 1

(B)

| | |
|---|---|
| Butadiene-styrene latex (GR–S 1022) | 100 |
| Rosin derivative (Tenex) | 75 |
| Antioxidant | 2 |
| Lanolin | 1 |

Other masses generally are useful provided they are based on natural or synthetic rubbers. The usual tackifying resins, antioxidants, curing resins, accelerators, fillers, etc. known to the prior art may be used in the adhesives as desired.

Any vinylidene chloride-acrylonitrile copolymer soluble in methylethyl ketone may be used in the present invention although the preferred proportions range from 85% to 45% vinylidene chloride and from 15% to 55% acrylonitrile. The Saran F220 used in the illustration A supra has an 80% vinylidene chloride and 20% acrylonitrile content. Suitable copolymers of these types can be prepared as illustrated in Canadian Letters Patent No. 520,788 of Nelson W. Abernethy and in U.S. Letters Patent No. 2,843,572 of Willis C. Wooten, Jr. and Donald J. Shields.

Butadiene-acrylonitrile copolymers which may be used are readily available commercially with acrylonitrile contents of from 28% to 40%. In the 38–40% acrylonitrile content range are Hycar 1001, Hycar 1041, Hycar 1411; in the 32–33% acrylonitrile content range are Hycar 1002, Hycar 1042, Hycar 1052, Hycar 1022, Hycar 1072, Hycar 1312 and Hycar 1432; and the 28–30% range is Hycar 1014. A description of the procedure for producing a butadiene-acrylonitrile copolymer is given in "Synthetic Rubber" by G. S. Whitby (John Wiley & Son, 1954). Following such procedure with the following components will produce a suitable copolymer for use in the present invention having a 32–33% acrylonitrile content:

| | Parts by weight |
|---|---|
| Butadiene (freshly distilled) | 66 |
| Acrylonitrile | 34 |
| Soap flakes | 4.5 |
| Stearic acid | 0.6 |
| Tertiary-dodecyl mercaptan | 0.5 |
| Potassium chloride | 0.3 |
| Sodium pyrophosphate (anhyd. basis) | 0.1 |
| Ferric sulfate (anhyd. basis) | 0.02 |
| Hydrogen peroxide (20% solution) (anhyd. basis) | 0.35 |
| Distilled water | 180 |

In addition, suitable butadiene-acrylonitrile copolymers may be prepared as illustrated in U.S. Letters Patent No. 2,373,753 to Charles F. Fryling.

Obviously, many variations may be made without departing from the spirit and scope of the invention as disclosed herein and, therefore, only such limitations should be imposed as are contained in the appended claims.

I claim:

1. In a pressure sensitive tape construction wherein the tape backing is formed from a polyethylene terephthalate film and the pressure sensitive adhesive is of the rubber-resin type, the improvement comprising interposing therebetween a primer adhesive comprising a mixture of a butadiene-acrylonitrile elastomer, a vinylidene chloride-acrylonitrile copolymer, a chloroprene polymer, a tackifying resin and a halogenated fatty acid, the ratio of components ranging from 6:6:3:10:1 to 6:6:12:0:12.

2. In a pressure sensitive tape construction wherein the tape backing is formed from a polyethylene terephthalate film and the pressure sensitive adhesive is of the rubber resin type, the improvement comprising interposing therebetween a first layer of primer adhesive in contact with said film comprising a mixture of a butadiene-acrylonitrile elastomer, a vinylidene chloride-acrylonitrile copolymer and a halogenated fatty acid, the ratio of elastomer to copolymer ranging from 1:1 to 1:4 and the halogenated fatty acid being present in from 5 to 15 parts by weight per 600 parts of the elastomer-copolymer, and a second layer of primer adhesive in contact with said first layer of primer adhesive and with said pressure sensitive adhesive comprising a butadiene-acrylonitrile elastomer and a rubber compatible with the rubber used in the said pressure sensitive adhesive, the ratio of elastomer to rubber ranging from 1:2 to 2:1.

References Cited by the Examiner

UNITED STATES PATENTS

| | | | |
|---|---|---|---|
| 2,547,605 | 4/51 | Signer et al. | 260—45.5 |
| 2,576,148 | 11/51 | Schechtman | 117—76 |
| 2,581,920 | 1/52 | Kuhn | 117—76 |
| 2,647,843 | 8/53 | Bemmels | 117—122 |
| 2,650,213 | 8/53 | Hofrichter | 117—122 |
| 2,653,884 | 9/53 | Hussey et al. | 117—76 |
| 2,785,087 | 3/57 | Franer et al. | 117—122 |
| 2,789,096 | 4/57 | Bruno et al. | 117—122 |
| 2,897,960 | 8/59 | Revoir | 117—122 |
| 2,937,956 | 5/60 | Fendius et al. | 117—122 |
| 2,991,270 | 7/61 | Roper et al. | 260—45.4 |
| 3,027,337 | 3/62 | Tritsch | 117—122 |
| 3,028,259 | 4/62 | Webber | 117—122 |
| 3,084,067 | 4/63 | Smith | 117—122 |

FOREIGN PATENTS 781,474   8/57   Great Britain.

WILLIAM D. MARTIN, *Primary Examiner.*